United States Patent [19]
Weyer

[11] Patent Number: 5,154,439
[45] Date of Patent: Oct. 13, 1992

[54] ARTICULATED UTILITY VEHICLE

[76] Inventor: Paul R. Weyer, P.O. Box 398, Enumclaw, Wash. 98022

[21] Appl. No.: 677,576

[22] Filed: Mar. 29, 1991

[51] Int. Cl.$^5$ .......................... B60D 1/42; B62D 53/00
[52] U.S. Cl. ....................................... 280/468; 180/20; 180/134; 172/184; 404/126; 280/426
[58] Field of Search .................... 180/20, 134, 235; 280/467, 468, 442, 472, 456.1, 463, 492, 494; 172/170, 184; 404/126, 123

[56] References Cited

U.S. PATENT DOCUMENTS

| | | | |
|---|---|---|---|
| 3,966,345 | 6/1976 | Kefel | 280/468 X |
| 4,505,349 | 3/1985 | Murphy | 180/20 X |
| 4,575,110 | 3/1986 | Kuhn et al. | 280/468 X |

OTHER PUBLICATIONS

Asphalt Compaction: Technology for Smooth Mats and Proper Density; Paving Tecnology '89, p. 81 (Feb. 1989).
Lower half of printed page illustrating "Easy Service-Simplified maintenance means more time on the job." showing an articulation assembly (Applicant admits this reference is prior art).

*Primary Examiner*—Charles A. Marmor
*Assistant Examiner*—Keven Hurley
*Attorney, Agent, or Firm*—Seed and Berry

[57] ABSTRACT

An articulated utility vehicle having forward and rearward frame portions, each supported by a roller. A pair of fluid-powered rotary actuators are positioned between the front and rear frame portions of the vehicle. One actuator accomplishes side shifting of the rear frame portion relative to the front frame portion. The side shifting actuator has its drive shaft secured to the front frame portion and is oriented with its longtitudinal axis extending horizontally. The other actuator provides for steering of the vehicle. The steering actuator has its body rigidly attached to the rear frame portion and has its axis oriented vertically. The steering actuator is positioned immediately below the side shifting actuator, and has its drive shaft extending upwardly to pivotally couple to a clevis rigidly attached to the body of the side shifting actuator. The actuators can be separately and simultaneously operated to achieve separate and simultaneous steering and side shifting of the vehicle.

12 Claims, 2 Drawing Sheets

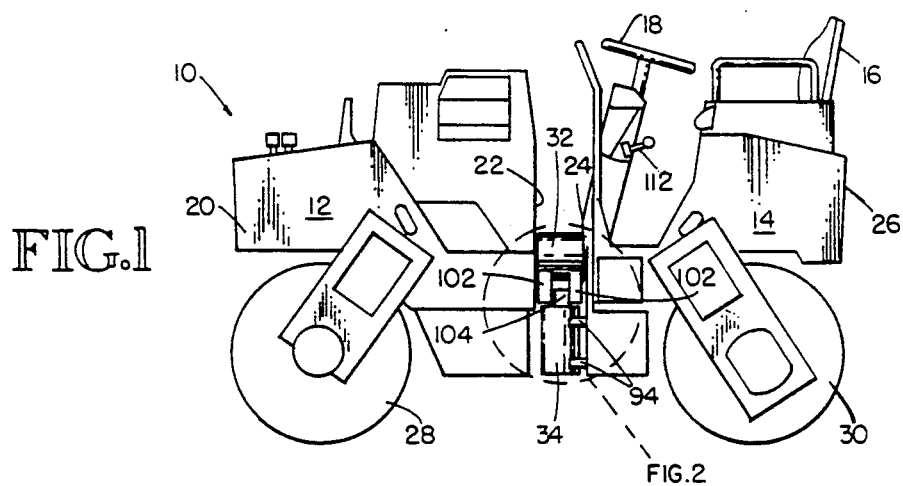
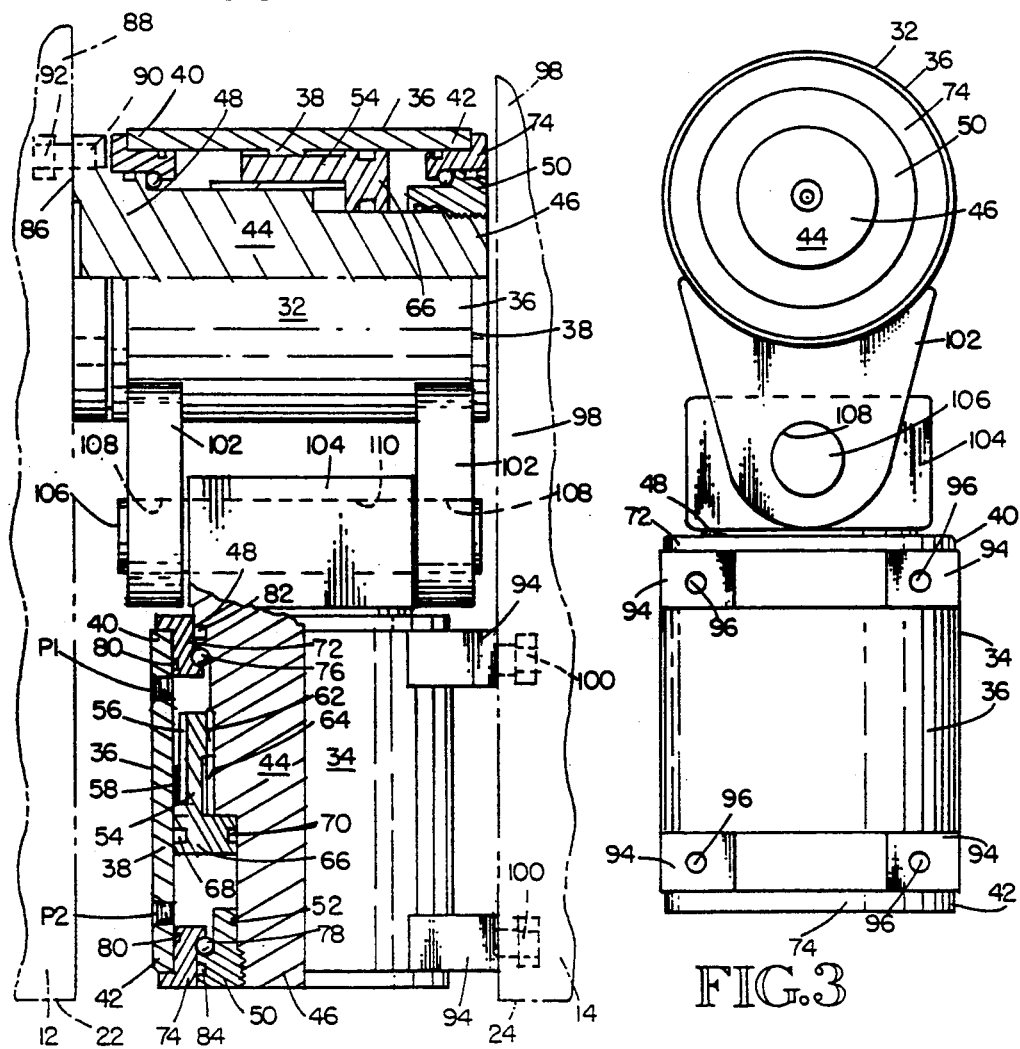

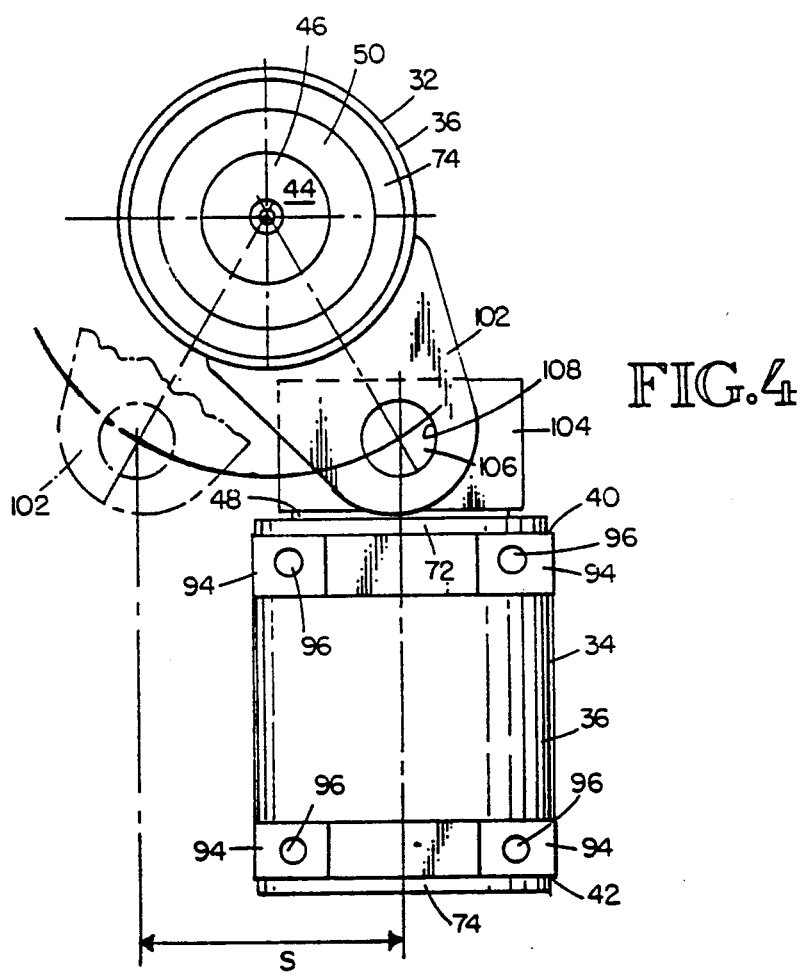
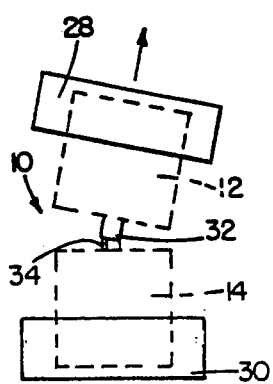 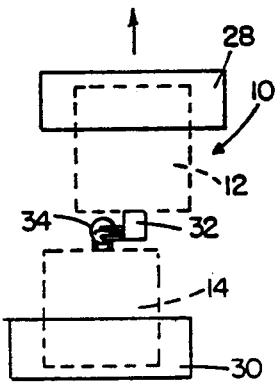 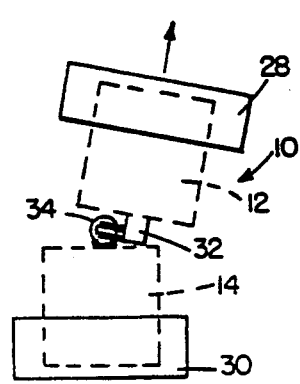

ARTICULATED UTILITY VEHICLE

TECHNICAL FIELD

The present invention relates generally to utility vehicles, and more particularly, to articulated utility vehicles.

BACKGROUND OF THE INVENTION

In the past, utility vehicles have used an articulated frame to improve maneuverability and ease of operation. With vehicles such as asphalt compactors, it is desirable to allow the operator to selectively, laterally offset the rear roller drum from the front roller drum. This is useful in situations such as when the operator wishes to run the front drum next to a curb and the rear drum several inches away from the curb when compacting an asphalt roadway so that the operator need only be concerned about the position of the front drum. This reduces the risk that the rear drum will inadvertently ride up onto and crack the curb, requiring expensive repair of the curb.

Being able to laterally offset the front and rear drums also helps the operator keep the rear drum away from an adjacent curb or wall when the vehicle is being turned. When an articulated vehicle such as an asphalt compactor turns away from an obstruction, the rear half of the frame momentarily moves towards the obstruction. If the rear drum is offset by several inches, the risk of the rear drum contacting the obstruction is greatly reduced.

While some prior art asphalt compactors have used frames with a single articulation joint and a mechanism to laterally offset the front and rear frame portions at the articulation joint, the designs have not produced optimal performance and result in an undesirably large increase in the overall length of the compactor. Of course, increasing the length of the compactor decreases the compactor's maneuverability and ease of operation.

It will therefore be appreciated that there has long been a significant need for an articulated utility vehicle with improved maneuverability and ease of operation. Preferably, the articulation joint will also provide for lateral offsetting of the front and rear frame portions. The utility vehicle should use an articulated joint design that minimizes the spacing required between the front and rear frame portions so as to reduce the overall length of the vehicle compared to articulated vehicles using prior art articulation joints which provide lateral offsetting. The present invention fulfills these needs and further provides other related advantages.

SUMMARY OF THE INVENTION

The present invention resides in an articulated utility vehicle having a first frame portion with first and second frame ends, and a second frame portion with first and second frame ends, with the first and second frame portions both supported above the ground by at least one ground-engaging member. The first frame portion second end is positioned adjacent to the second frame portion first end. The first and second frame portions are turnable and laterally movable relative to each other.

The vehicle further has first and second fluid-powered rotary actuators. Each of the actuators includes a body having a longitudinal axis, a drive member extending generally longitudinally and coaxially within the body and is supported for rotational movement relative to the body, and a torque-transmitting member mounted for longitudinal movement within the body in response to selective application of pressurized fluid thereto. The torque-transmitting member engages the body and the drive member to translate longitudinal movement of the torque-transmitting member into rotational movement of the drive member relative to the body. The drive member has an attachment portion.

The first actuator is positioned at the second end of the first frame portion with its axis being oriented substantially horizontally. The second actuator is positioned at the first end of the second frame portion with its axis being oriented substantially vertically. The second actuator is positioned immediately below the first actuator in a preferred embodiment of the invention.

One of the drive member attachment portion or the body of the first actuator is rigidly attached to the first frame portion. Similarly, one of the drive member attachment portion or the body of the second actuator is rigidly attached to the second frame portion. The other of the drive member attachment portion or body of the first actuator is coupled to the other one of the drive member attachment portion or body of the second actuator to permit left and right pivotal movement between the first and second actuators through a generally vertical plane generally transverse to the first frame portion. This produces selective left and right lateral displacement of the second frame portion relative to the first frame portion upon selective rotation of the drive member of the first actuator relative to its body.

The selective rotation of the drive member of the second actuator relative to its body produces clockwise and counterclockwise rotational movement of the first actuator through a generally horizontal plane about the second actuator axis to provide selective left or right turning of the first frame portion.

In the preferred embodiment of the invention, the drive member attachment portion of the first actuator is rigidly attached to the first frame portion, and the body of the second actuator is rigidly attached to the second frame portion. The body of the first actuator is coupled to the drive member attachment portion of the second actuator. The body of the first actuator includes a coupling portion and the drive member attachment portion of the second actuator is pivotally coupled to the coupling portion.

In the preferred embodiment, the first actuator body has a sidewall and the coupling portion includes a pair of projections rigidly attached to the body sidewall at spaced-apart positions. The drive member attachment portion of the second actuator includes a pivot pin oriented generally transverse to the axis of the second actuator. The pivot pin is received by both of the first actuator projections to permit left and right pivotal movement between the first actuator body and the second actuator drive member. The projections are preferably spaced apart along the axis of the first actuator. In the preferred embodiment, each of the drive member attachment portions of the first and second actuators project outwardly beyond the end of the actuator bodies.

Other features and advantages of the invention will become apparent from the following detailed description, taken in conjunction with the accompanying drawings.

BRIEF DESCRIPTION OF THE DRAWINGS

FIG. 1 is a left side elevational view of an articulated utility vehicle embodying the present invention.

FIG. 2 is an enlarged, sectional, fragmentary side elevational view of the encircled portion of FIG. 1, showing the articulation joint of the present invention.

FIG. 3 is a rear view of the articulation joint of FIG. 2 shown removed from the vehicle.

FIG. 4 is a rear view of the articulation joint shown in FIG. 3, showing the side shifting actuator shifted to the fully right shift position, with the side shifting actuator shown in phantom in the fully left shift position.

FIG. 5 is a schematic drawing of the vehicle of FIG. 1 shown with the steering actuator in the maximum right turn position without any lateral offsetting of the front and rear frame portions.

FIG. 6 is a schematic drawing of the vehicle of FIG. 1 shown with the side shifting actuator in the maximum left shift position to laterally offset to the left the rear frame portion relative to the front frame portion without any turning.

FIG. 7 is a schematic drawing of the vehicle of FIG. 1 shown with the steering actuator in the maximum right turn position and with the side shifting actuator in the maximum left shift position to laterally offset the rear frame portion to the left of the front frame portion.

DETAILED DESCRIPTION OF THE INVENTION

As shown in the drawings for purposes of illustration, the present invention is embodied in an articulated utility vehicle 10. While the vehicle 10 is illustrated as an asphalt compactor, the vehicle may have other constructions, such as a loader. The illustrated vehicle 10 includes a front frame portion 12 and a rear frame portion 14. In conventional manner, a seat 16 and a steering wheel 18 are shown mounted to the rear frame portion 14.

The front frame portion 12 extends between front and rear frame ends 20 and 22, respectively, and has left and right sides. The rear frame portion 14 extends between front and rear frame ends 24 and 26, respectively, and has left and right sides. The front frame portion rear end 22 is positioned adjacent to the rear frame portion front end 24, and the front and rear frame portions 12 and 14 are turnable to the left and right and laterally movable to the left and right relative to each other. The vehicle 10 includes a front end drum 28 rollingly supporting the front frame portion 12, and a rear drum 30 rollingly supporting the rear frame portion 14 to hold the front and rear frame portions above the ground and apply rolling pressure on the asphalt or other material on the ground to be compacted.

The vehicle 10 includes a side shifting fluid-powered rotary actuator 32 and a steering fluid-powered rotary actuator 34. The side shifting and steering actuators 32 and 34 are positioned in the space between the rear end 22 of the front frame portion 12 and the front end 24 of the rear frame portion 14.

As shown in FIG. 2, each of the side shifting and steering actuators 32 and 34 includes an elongated housing or body 36 having a cylindrical sidewall 38, and first and second ends 40 and 42, respectively. A rotary drive shaft 44 is coaxially positioned within the body 36 and supported for rotation relative to the body. In the illustrated embodiment of the invention, both actuators have the same design, but only the steering actuator 34 shown in FIG. 2 is annotated with all reference numerals illustrating the details of the actuator construction. It is to be recognized that alternative fluid-powered rotary actuator designs can be used.

The drive shaft 44 includes an elongated portion 46 axially extending substantially the full length of the body 36 and a radially outward projecting flange portion 48. The shaft portion 46 and the flange portion 48 are formed as an integral unit such as from a single piece of machined stock. The flange portion 48 is positioned at the body first end 40 and protrudes beyond the body first end 40.

The shaft portion 46 has an annular carrier or shaft nut 50 threadably attached thereto toward the body second end 42. The shaft nut 50 has a threaded interior portion threadably attached to a correspondingly threaded perimeter portion of the shaft portion 46. The shaft nut 50 is locked in place against rotation by a set screw (not shown). A seal 52 is disposed between the shaft nut 50 and the shaft portion 46 to provide a fluid-tight seal therebetween.

The actuators 32 and 34 each use conventional linear-to-rotary transmission means which includes an annular piston sleeve 54 which is reciprocally mounted within the body 36 coaxially about the drive shaft 44. The piston sleeve 54 has outer helical splines 56 over a portion of its length which mesh with inner helical splines 58 of a splined intermediate interior portion of the body sidewall 38. The piston sleeve 54 is also provided with inner helical splines 62 which mesh with outer helical splines 64 provided on a splined intermediate portion of the shaft portion 46. It should be understood that while helical splines are shown in the drawings and described herein, the principle of the invention is equally applicable to any form of linear-to-rotary motion conversion means, such as balls or rollers.

In the illustrated embodiment of the invention, the piston sleeve 54 has a piston head 66 positioned toward the body second end 42. The piston head 66 is slidably maintained within the body 36 for reciprocal movement, and undergoes longitudinal and rotational movement relative to a smooth interior wall surface of the body sidewall 38, as will be described in more detail below.

A seal 68 is disposed between the piston head 66 and the interior wall surface of the body sidewall 38 to provide a fluid-tight seal therebetween. A seal 70 is disposed between the piston head 66 and a smooth exterior wall surface of the shaft portion 46 to provide a fluid-tight seal therebetween.

As will be readily understood, reciprocation of the piston head 66 within the body 36 occurs when hydraulic oil, air or any other suitable fluid under pressure selectively enters through one or the other of a first port P1 which is in fluid communication with a fluid-tight compartment to a side of the piston head toward the body first end 40 or through a second port P2 which is in fluid communication with a fluid-tight compartment to a side of the piston head toward the body second end 42. As the piston head 66 and the piston sleeve 54 of which the piston head is a part, linearly reciprocates in an axial direction within the body 36, the outer helical splines 56 of the piston sleeve engage or mesh with the inner helical splines 58 of the body sidewall 38 to cause rotation of the piston sleeve. The linear and rotational movement of the piston sleeve 54 is transmitted through the inner helical splines 62 of the piston sleeve to the outer helical splines 64 of the shaft portion 46 to cause the drive shaft 44 to rotate. Longitudinal movement of the drive shaft 44 is restricted, thereby converting all movement of the piston sleeve 54 into rotational movement of the drive shaft 44. Depending on the slope and direction of turn of the various helical splines, there may be provided a multiplication of the rotary output of the drive shaft 44.

The application of fluid pressure to the first port P1 produces axial movement of the piston sleeve 54 toward the body second end 42. The application of fluid pressure to the second port P2 produces axial movement of the piston sleeve 54 toward the body first end 40. The actuators 32 and 34 each provide relative rotational movement between its body 36 and drive shaft 44 through the conversion of linear movement of the piston sleeve 54 into rotational movement of the drive shaft, in a manner well known in the art.

The actuators 32 and 34 each includes first and second inserts 72 and 74, respectively. Each of the first and second inserts 72 and 74 has an annular sidewall portion with a central aperture. The sidewall portion of the first insert 72 is coaxially positioned within the body 36 at the body first end 40, and has its central aperture sized to rotatably receive the shaft flange portion 48 therein. An exterior ball race is formed on the flange portion 48, and an interior ball race is formed on the first insert sidewall portion confronting and corresponding to the flange portion ball race. The flange portion and first insert ball races extend circumferentially, fully about the flange portion 48 and form a first set of races. A plurality of steel ball bearings 76 are seated in the first set of races and rotatably support the flange portion 48 for rotational movement of the drive shaft 44 relative to the body 36.

Similarly, the sidewall portion of the second insert 74 is coaxially positioned within the body 36 at the body second end 42, and has its central aperture sized to rotatably receive the shaft nut 50 therein. An exterior ball race is formed on the shaft nut 50, and an interior ball race is formed on the second insert sidewall portion confronting and corresponding to the shaft nut ball race. The shaft nut and second insert ball races extend circumferentially, fully about the shaft nut 50 and form a second set of races. A plurality of steel ball bearings 78 are seated in the second set of races and rotatably support the shaft nut 50 for rotational movement of the drive shaft 44 relative to the body 36. The first and second sets of races with the ball bearings 76 and 78 therein serve to support the shaft 44 against moment loads and both radial and axial thrust loads.

The first and second inserts 72 and 74 each have a circumferentially extending flange positioned exterior of the body 36 and projecting outward beyond the corresponding body first or second end 40 or 42 to engage an endwall of the body sidewall 38 and prevent inward axial movement of the insert during fluid-powered operation of the actuator.

A seal 80 is disposed between each of the first and second inserts 72 and 74 and the body sidewall 38. A seal 82 is disposed between the first insert 72 and the shaft flange portion 48, and a seal 84 is disposed between the second insert 74 and the shaft nut 50. The seals 80, 82 and 84 provide fluid-tight seals which prevent fluid leakage from the body 36.

As previously described, the shaft nut 50 is threadably received on the shaft portion 46. By adjustably rotating the shaft nut 50 prior to commencing fluid-powered operation of the actuators 32 and 34, the shaft nut can be axially positioned within the body 36 on the shaft portion 46 relative to the first and second inserts 72 and 74 to pre-load the ball bearings 76 and 78 seated in the first and second sets of races.

The flange portion 48 of the side shifting actuator 32 has an outwardly facing mounting surface 86 which is positioned against a mounting plate 88 at the rear end 22 of the front frame portion 12. The flange portion 48 of the side shifting actuator 32 has a plurality of threaded attachment holes 90 circumferentially spaced thereabout for rigidly attaching the drive shaft 44 of the side shifting actuator to the rear end mounting plate 88 using a plurality of fastening bolts 92. The side shifting actuator 32 is positioned generally midway between the left and right sides of the front frame portion 12, with its longitudinal axis oriented substantially horizontally and extending parallel to a center axis of the vehicle 10 which runs from the front end 20 of the front frame portion 12 to the rear end 26 of the rear frame portion 14 when the vehicle is travelling in a straight line.

The body 36 of the steering actuator 34 has two pairs of outwardly projecting attachment brackets 94, each pair being located toward one of the body first or second ends 40 or 42. Each bracket 94 has a threaded hole 96 for rigidly attaching the body 36 of the steering actuator 34 to a mounting plate 98 at the front end 24 of the rear frame portion 14 using four fastening bolts 100. The steering actuator 34 is positioned generally midway between the left and right sides of the rear frame portion 14, immediately below the side shifting actuator 32, and has its longitudinal axis oriented substantially vertically. It is to be noted that the same results can be achieved by attaching the steering actuator 34 to the front frame portion 12 and the side shifting actuator 32 to the rear frame portion 14.

The body 36 of the side shifting actuator 32 has a clevis 102 rigidly attached thereto and projecting downward toward the steering actuator 34 positioned therebelow when the side shifting actuator has its piston sleeve 54 in a central operational position which allows rotation of its body 36 both clockwise and counterclockwise from the central portion. The spaced-apart projections of the clevis 102 are spaced apart along the longitudinal axis of its body 36.

The shaft flange portion 48 of the steering actuator 34 has a generally rectangular coupling portion 104 which projects upward and outward beyond its body first end 40 to fit snugly between the clevis 102 of the side shifting actuator 32. A pivot pin 106 is received in apertures 108 in the clevis 102 and an aperture 110 in the coupling portion 104 to pivotally couple the drive shaft 44 of the steering actuator 34 to the body 36 of the side shifting actuator 32 to permit left and right pivotal movement between the body 36 of the side shifting actuator and the drive shaft 44 of the steering actuator through a generally vertical plane generally transverse to the front frame portion 12.

By selectively rotating the body 36 of the side shifting actuator 32 clockwise and counterclockwise relative to its drive shaft 44 (as viewed in FIGS. 3 and 4), left and right side shifting of the rear frame portion 14 relative to the front frame portion 12 is accomplished. The two desired extremes of rotation of the side shifting actuator 32 are shown in FIG. 4, and the vehicle 10 is shown in FIGS. 6 and 7 with the rear frame portion 14 shifted fully left relative to the front frame portion 12 to produce a maximum left lateral offset between the front and rear frame portions. As presently designed, a maximum side shifting of 3.5 inches to each side is provided, for a total side-to-side lateral movement of 7.0 inches (indicated by references letter "S" in FIG. 4). A manually operated control valve lever 112 is provided adjacent to the steering wheel 18 to allow an operator of the vehicle 10 to selectively apply pressurized fluid to the piston sleeve 54 of the side shifting actuator 32 to select the amount of side shifting desired.

By selectively rotating the body 36 of the steering actuator 34 clockwise or counterclockwise relative to its drive shaft 44 (as viewed from above in FIGS. 2–4), steering of the vehicle 10 is accomplished, with or without the side shifting actuator 32 simultaneously causing side shifting of the rear frame portion 14 relative to the front frame portion 12. The vehicle 10 is shown in FIG. 5 turning to the right without any side shifting. The vehicle 10 is shown in FIG. 7 turning to the right with the rear frame portion 14 simultaneously fully side shifted to the left of the front frame portion 12. When the drive shaft 44 of the steering actuator 34 is rotated, the body 32 of the side shifting actuator 32 is rotated through a generally horizontal plane about the axis of the steering actuator, thereby producing selective left and right turning of the front frame portion 12 relative to the rear frame portion 14.

The steering wheel 18 is connected to a fluid-control valve (not shown) which selectively applies pressurized fluid to the piston sleeve 54 of the steering actuator 34 to select the amount of left or right turning desired. As noted above, the steering actuator 34 and the side shifting actuator 32 can be operated separately and also simultaneously to accomplish the separate and simultaneous steering and side shifting of the vehicle 10. Also, side shifting can be accomplished independent of steering, and steering independent of side shifting.

The result is a highly maneuverable and easy to operate articulated vehicle 10 which has both articulated steering and side shifting ability. This is accomplished with minimum spacing being required between the front and rear frame portions 12 and 14 to provide a reduced overall length for the vehicle. Since the fluid-powered actuators 32 and 34 used inherently have a high torque output and can be accurately controlled, a superior vehicle performance is achieved even for large articulated vehicles and articulated vehicles carrying heavy loads over rough terrain.

If desired, the vehicle 10 may be sold without the side shifting actuator 32 and with a bracket rigidly attached to the front frame portion 12 instead. The bracket would be configured and positioned similar to the clevis 102 to allow convenient connection of the steering actuator 34 thereto.

It is to be understood that the invention may also be practiced with the drive shaft 44 of the steering actuator 34 rigidly attached to the rear frame portion 14 and the rotational drive for steering provided by rotation of the body 36. Also, the body 36 of the side shifting actuator 32 may be rigidly attached to the front frame portion 12 and the rotational drive for side shifting provided by rotation of the drive shaft 44.

It will be appreciated that, although a specific embodiment of the invention has been described herein for purposes of illustration, various modifications may be made without department from the spirit and scope of the invention. Accordingly, the invention is not limited except as by the appended claims.

I claim:

1. An articulated utility vehicle, comprising:

a first frame portion having first and second frame ends and supported above the ground by at least one ground engaging first member;

a second frame portion having first and second frame ends and supported above the ground by at least one ground engaging second member, said first frame portion second end being positioned adjacent to said second frame portion first end, said first and second frame portions being turnable and laterally movable relative to each other; and first and second fluid-powered rotary actuators, each of said first and second actuators including: a body having a longitudinal axis; a drive member extending generally longitudinally and co-axially within said body and being supported for rotational movement relative to said body, said drive member having an attachment portion; and a torque-transmitting member mounted for longitudinal movement within said body in response to selective application of pressurized fluid thereto, said torque-transmitting member engaging said body and said drive member to translate longitudinal movement of said torque-transmitting member into rotational movement of said drive member relative to said body; said first actuator being positioned at said second end of said first frame portion with said first actuator axis being oriented substantially horizontally and said second actuator being positioned at said first end of said second frame portion with said second actuator axis being oriented substantially vertically, said drive member attachment portion of said first actuator being rigidly attached to said first frame portion and said body of said second actuator being rigidly attached to said second frame portion, said body of said first actuator being coupled to said drive member attachment portion of said second actuator to permit left and right pivotal movement between said first actuator body and said second actuator drive member through a generally vertical plane generally transverse to said first frame portion producing selective left or right lateral displacement of said second frame portion relative to said first frame portion upon selective rotation of said body of said first actuator, and to permit clockwise and counterclockwise rotational movement of said first actuator body about said second actuator axis through a generally horizontal plane producing selective left or right turning of said first frame portion relative to said second frame portion upon selective rotation of said drive member of said second actuator.

2. The vehicle of claim 1 wherein said body of said first actuator includes a coupling portion and said drive member attachment portion of said second actuator is pivotally coupled to said coupling portion.

3. The vehicle of claim 2 wherein said first actuator body has a sidewall and said coupling portion includes a pair of projections rigidly attached to said body sidewall at spaced-apart positions, and said drive member attachment portion of said second actuator includes a pivot pin oriented generally transverse to said axis of said second actuator and received by both of said first actuator projections to permit left and right pivotal movement between said first actuator body and said second actuator drive member.

4. The vehicle of claim 3 wherein said projections are spaced apart along said axis of said first actuator.

5. The vehicle of claim 2 wherein one of said coupling portions of said first actuator body or said drive member attachment portion of said second actuator has a pair of spaced-apart projections rigidly attached thereto and the other of said first actuator coupling portion or said second actuator attachment portion has a cooperating projection which extends between said pair of projections with at least one pivot pin oriented generally transverse to said axis of said second actuator and pivotally coupling said pair of projections and said cooperating projection together to permit left and right pivotal movement between said first actuator body and said second actuator drive member.

6. The vehicle of claim 1 wherein each of said drive member attachment portions of said first and second actuators project outwardly beyond one end of said first and second actuator bodies.

7. The vehicle of claim 1 wherein said first actuator is positioned generally midway between the left and right sides of said first frame portion and said second actuator is positioned generally midway between the left and right sides of said second frame portion and immediately below said first actuator.

8. The vehicle of claim 7 wherein the other one of said drive member attachment portion or said body of said side shifting actuator has a first coupling portion, and the other one of said drive member attachment portion or said body of said steering actuator has a second coupling portion pivotally coupled to said first coupling portion.

9. The vehicle of claim 8 wherein one or the other of said first or second coupling portions includes a pair of spaced-apart projections and the other includes a cooperating projection positioned between said pair of projections with at least one pivot pin oriented generally transverse to said axis of said steering actuator and pivotally coupling said pair of projections and said cooperating projection together to permit left and right pivotal movement therebetween.

10. An articulated utility vehicle, comprising:
a first frame portion having first and second frame ends and supported above the ground by at least one ground engaging first member;
a second frame portion having first and second frame ends and supported above the ground by at least one ground engaging second member, said first frame portion second end being positioned adjacent to said second frame portion first end, said first and second frame portions being turnable and laterally movable relative to each other; and
side shifting and steering fluid-powered rotary actuators, each of said actuators including: a body having a longitudinal axis; a drive member extending generally longitudinally and co-axially within said body and being supported for rotational movement relative to said body, said drive member having an attachment portion; and a torque-transmitting member mounted for longitudinal movement within said body in response to selective application of pressurized fluid thereto, said torque-transmitting member engaging said body and said drive member to translate longitudinal movement of said torque-transmitting member into rotational movement of said drive member relative to said body; said side shifting actuator being positioned at said second end of said first frame portion with said side shifting actuator axis being oriented substantially horizontally and said steering actuator being positioned at said first end of said second frame portion with said steering actuator axis being oriented substantially vertically, one of said drive member attachment portion of said body of said side shifting actuator being rigidly attached to said first frame portion and one of said drive member attachment portion or said body of said steering actuator being rigidly attached to said second frame portion, the other one of said drive member attachment portion or said body of said side shifting actuator being coupled to the other one of said drive member attachment portion or said body of said steering actuator to permit left and right pivotal movement between said side shifting and steering actuators through a generally vertical plane generally transverse to said side shifting frame portion producing selective left or right lateral displacement of said second frame portion relative to said first frame portion upon selective rotation of said drive member relative to said body of said side shifting actuator, and to permit clockwise and counterclockwise rotational movement of said side shifting actuator about said steering actuator axis through a generally horizontal plane producing selective left or right turning of said first frame portion relative to said second frame portion upon selective rotation of said drive member relative to said body of said steering actuator.

11. The vehicle of claim 10 wherein each of said drive member attachment portions of said side shifting and steering apparatus project outwardly beyond one end of said side shifting and steering actuator bodies, respectively.

12. An articulated utility vehicle, comprising:
a first frame portion having first and second frame ends and supported above the ground by at least one ground engaging first member;
a second frame portion having first and second frame ends and supported above the ground by at least one ground engaging second member, said first frame portion second end being positioned adjacent to said second frame portion first end, said first and second frame portions being turnable and relative to each other; and
a fluid-powered rotary actuator having a body with a longitudinal axis, a drive member extending generally longitudinally and co-axially within said body and being supported for rotational movement relative to said body, said drive member having an attachment portion; and a torque-transmitting member mounted for longitudinal movement within said body in response to selective application of pressurized fluid thereto, said torque-transmitting member engaging said body and said drive member to translate longitudinal movement of said torque-transmitting member into rotational movement of said drive member relative to said body, said actuator being positioned at said second end of said first frame portion with said actuator axis being oriented substantially vertically, one of said drive member attachment portion or said body being attached to said first frame portion and the other being attached to said second frame portion to produce selective left or right turning of said first frame portion relative to said second frame portion upon selective rotation of said drive member relative to said body.

* * * * *

UNITED STATES PATENT AND TRADEMARK OFFICE
CERTIFICATE OF CORRECTION

PATENT NO. : 5,154,439
DATED : October 13, 1992
INVENTOR(S) : Paul P. Weyer

It is certified that error appears in the above-identified patent and that said Letters Patent is hereby corrected as shown below:

In the title page, under heading of "Inventor" please delete "Paul R. Weyer" and substitute therefor --Paul P. Weyer--.

In column 10, claim 10, line 4, please delete after "portion" the word "of".

In column 10, claim 11, line 31, please delete "apparatus" and substitute therefor --actuators--.

In column 10, claim 12, line 43, please delete the second "and" between "turnable" and "relative".

Signed and Sealed this

Twelfth Day of October, 1993

Attest:

BRUCE LEHMAN

Attesting Officer

Commissioner of Patents and Trademarks